Nov. 29, 1960   E. M. RAMBERG ET AL   2,962,050
NO-MOTION BRAID
Filed Oct. 14, 1957

INVENTOR.
Einar M. Ramberg
Morris Dolberberg
BY Emery, Whittemore
Sandoe & Dix.
ATTORNEYS

United States Patent Office 2,962,050
Patented Nov. 29, 1960

2,962,050

NO-MOTION BRAID

Einar M. Ramberg, Longmeadow, and Morris Goldenberg, Springfield, Mass., assignors to Titeflex, Inc., Springfield, Mass., a corporation of Massachusetts Filed Oct. 14, 1957, Ser. No. 689,810

3 Claims. (Cl. 138—60)

This invention relates to high pressure, flexible braid-covered hose; and more especially to an application of the braid to the hose with angles of lay that eliminate relative motion of the braid strands with respect to each other as a result of variations in the pressure in the hose.

Woven braid made of wire or flat strips is used around the outside surface of hoses to prevent radial enlargement of the hose as well as longitudinal elongation. The original bursting strength of the hose is impaired when the wire or strips, hereinafter referred to as braid "strands," wear thinner as the result of abrasion.

The braid strands, which are preferably made of metal, have friction on one another when there is relative movement; and in braided hoses of the prior art, this friction and motion have caused very rapid wear resulting in premature failure of the hose. One of the tests for braided hose has been for "impulse failure"; that is, the life of the hose when subjecting alternating increases and decreases in pressure sufficient to cause movement of the braid strands over one another and resulting changes in the length of the hose.

It is an object of this invention to provide an improved hose with a braid reinforcement in which the strands do not move with respect to one another as the result of pressure variations up to a specified test pressure usually between 20% and 25% of the burst pressure. Any additional motion due to further pressure increases is small compared to standard configurations. The angle at which the strands are applied to the hose is selected so that a balance exists between the tendency of a small helix angle braid to lengthen with increase in pressure, and the tendency of a large helix angle braid to shorten when the pressure is increased.

For any selected size of hose, strand, or both, the braid angle of this invention does not produce the highest static bursting pressure for the hose because the size of the angle is proportioned to the strength of the wire, but it provides a hose that maintains its high bursting pressure after being put into use under severe conditions.

Other objects, features and advantages of the invention will appear or be pointed out as the description proceeds.

In the drawing, forming a part hereof, in which like reference characters indicate corresponding parts in all the views.

Figure 1:
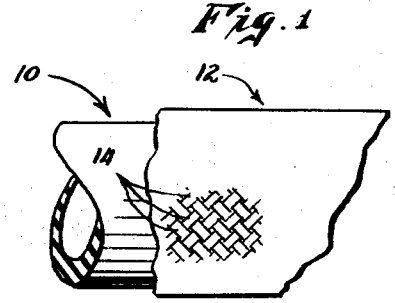
Figure 1 is a fragmentary view, showing a length of hose with a woven braid of metal strands applied at an angle which prevents braid motion with changes in fluid pressure in the hose.

The drawing shows a flexible tube 10 made of resilient material such as rubber, but preferably "Teflon," a plastic manufactured by the Du Pont de Nemours Company of Wilmington, Delaware. This Teflon plastic is polytetrofluoroethylene. Other kinds of material can be used for the tube 10, which constitutes the inner portion of the hose, the invention being intended primarily for use with plastic tubes which require radial restraint and are capable of some swelling without rupture when subjected to high internal pressure. These are to usual characteristics of hoses on which woven metal braid is used.

The outer portion of the hose consists of a woven braid 12 made of metal strands 14. In the construction illustrated, single strands 14 are woven but it is common to have 2, 3 or more strands side-by-side and woven with similar groups of strands in the same way as the single strands are woven in Figure 1.

Unlike the usual woven fabric having warp and woof strands at right angles to one another, the strands of both warp and woof extend around the tube 10 along helical courses with the pitch of the helix correlated with the circumference or diameter of the braid to produce an unusual braid angle.

Figure 2:
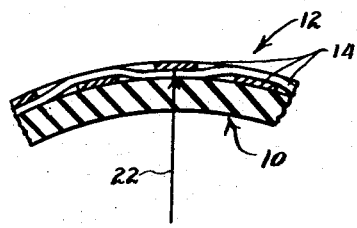
Figure 2 is a greatly enlarged fragmentary view showing the weaving of one of the braid strands.

We have discovered that when the braid angle is 34°, there is no motion of the strands as the result of pressure variations in the hose. The "braid angle" is the angle having a tangent equal to the pitch of the helix of the braid strands divided by the circumference of the braid. Thus, the braid angle may be expressed by the equation:

$$\text{arc tan} = \text{pitch/circumference}$$
$$= \text{pitch}/\pi d$$

where $d$ is the average diameter of the braid as measured between points inside the outer strands but outside the inner strands; for example, the point of the arrow 22 in Figure 2 and the corresponding point on the opposite side of the hose.

Figure 3:
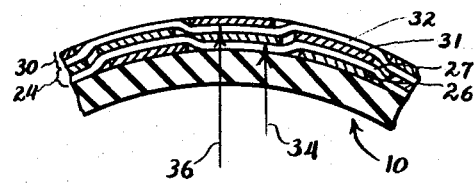
Figure 3 is a fragmentary view, showing a double braided hose with one layer of woven braid overlying another.

When the hose has a double braid, as illustrated in Figure 3, the inner braid is considered separately from the outer braid. Figure 3 shows an inner braid 24 having warp and woof strands 26 and 27, respectively; and an outer braid 30 having warp and woof wires 31 and 32, respectively. The diameter of the inner braid 24, is measured from the point of the arrow 34, this point being between strands 26 and 27; while the diameter of the outer braid 30 is measured from the point of the arrow 36, and this latter point is between the strands 31 and 32.

The braiding machine that applies the braid is set to apply the strands with a pitch so corelated to the diameter that the ratio of pitch to braid circumference (i.e. $\pi$ multiplied by braid diameter) is equal to the tangent of 34°. This tangent is 0.6745.

The pitch of the braid to provide the desired braid angle may be expressed by the equation;

$$\text{Pitch} = \tan 34° \times \text{circumference}$$
$$= \tan 34° \times \pi d$$
$$= .6745 \times \pi \times d$$
$$= 2.12 d$$

Figure 4:
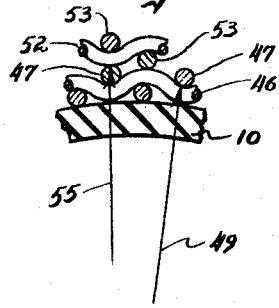
Figure 4 is a diagrammatic sectional view, showing the braid made of wire strands in contrast to the strips shown in Figure 3.

Figure 4 shows a double braid similar to that shown in Figure 3 but made with wire strands instead of strips. The inner braid includes warp wires 46 and woof wires 47. The diameter of the braid, for purposes of computing braid angle, is the average braid diameter; that is, the diameter measured to the point of the arrow 49 and the diametrically opposite point of the braid at which the warp and woof wires contact with one another.

The outer braid, in Figure 4, includes warp wires 52 and woof wires 53; and the diameter of this outer braid is measured from the point of the arrow 55 to the diametrically opposite point of the braid at which wires 52 and 53 contact with one another.

It is not always possible to obtain the ideal angle of braid when applying strands to a tube of a given diameter with a particular braiding machine. Gears should be chosen to approach as nearly as possible to 34°. Different gears preferably are used for the outer braid, when there is an outer braid, to get a tighter weave.

To obtain substantially no motion of the braid with changes in the fluid pressure in the hose, the braid angle should be kept within a range from 32 to 36 degrees, when the 34-degree angle cannot be obtained.

The preferred embodiment of the invention has been illustrated and described, but it will be understood that changes and modifications can be made in this construction without departing from the invention as defined in the claims.

What is claimed is:

1. A flexible wire-reinforced hose comprising an inner, flexible membrane providing a fluid conduit through said hose, and a braided wire mesh covering ensheathing said membrane, the wires of said mesh each having a braid angle of substantially 34°.

2. A hose as in claim 1 wherein the wire mesh is the sole means for imposing any substantial restraint on dimensional variations in said membrane as a result of internal fluid pressure.

3. A hose as in claim 1 wherein a second wire mesh covering is braided directly upon the first wire mesh covering and the wires of said second wire mesh also have a braid angle of substantially 34°.

References Cited in the file of this patent

UNITED STATES PATENTS

| | | |
|---|---|---|
| 1,978,211 | Loughhead | Oct. 23, 1934 |
| 2,787,289 | Press | Apr. 2, 1957 |
| 2,829,671 | Ernst et al. | Apr. 8, 1958 |

FOREIGN PATENTS

| | | |
|---|---|---|
| 901,481 | France | July 27, 1945 |
| 902,203 | Germany | Jan. 21, 1954 |